(12) United States Patent
Oppenheim et al.

(10) Patent No.: US 8,475,571 B2
(45) Date of Patent: Jul. 2, 2013

(54) SYSTEM FOR GAS PURIFICATION AND RECOVERY WITH MULTIPLE SOLVENTS

(75) Inventors: Judith Pauline Oppenheim, Friendswood, TX (US); Anindra Mazumdar, Katy, TX (US)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 12/766,826

(22) Filed: Apr. 23, 2010

(65) Prior Publication Data

US 2011/0259197 A1 Oct. 27, 2011

(51) Int. Cl.
*B01D 53/14* (2006.01)

(52) U.S. Cl.
USPC .......... 95/160; 95/163; 95/172; 95/177; 95/192; 95/199; 95/223; 95/235; 95/236; 96/234

(58) Field of Classification Search
USPC .......... 95/199, 234–236, 160, 163, 172, 95/177, 192, 223; 96/234, 327
See application file for complete search history.

(56) References Cited

U.S. PATENT DOCUMENTS

| | | | | |
|---|---|---|---|---|
| 3,594,985 A | * | 7/1971 | Ameen et al. | 95/163 |
| 4,080,424 A | * | 3/1978 | Miller et al. | 423/223 |
| 4,242,108 A | | 12/1980 | Nicholas et al. | |
| 4,252,548 A | * | 2/1981 | Markbreiter et al. | 62/632 |
| 4,305,733 A | * | 12/1981 | Scholz et al. | 48/127.3 |
| 4,568,364 A | | 2/1986 | Galstaun et al. | |
| 6,207,120 B1 | | 3/2001 | Belmonte et al. | |
| 7,374,734 B2 | | 5/2008 | Grossman et al. | |
| 8,118,915 B2 | * | 2/2012 | Stinson | 95/183 |
| 2009/0095155 A1 | | 4/2009 | Frydman et al. | |
| 2009/0120285 A1 | | 5/2009 | Thacker et al. | |
| 2010/0111784 A1 | * | 5/2010 | Mak et al. | 422/190 |

FOREIGN PATENT DOCUMENTS

| | | |
|---|---|---|
| EP | 0399608 A2 | 11/1900 |
| EP | 2253586 A1 | 11/2010 |
| WO | 9639243 | 12/1996 |
| WO | 0001654 | 1/2000 |
| WO | 0073202 A1 | 12/2000 |
| WO | 2008103467 A1 | 8/2008 |
| WO | WO 2008/103467 A1 * | 8/2008 |
| WO | 2010021800 A2 | 2/2010 |

OTHER PUBLICATIONS

Burr, Barry and Lili Lyddon, "A Comparison of Physical Solvents for Acid Gas Removal," Bryan Research and Engineering, Inc., Bryan, TX, Date Unknown.

(Continued)

*Primary Examiner* — Duane Smith
(74) *Attorney, Agent, or Firm* — Fletcher Yoder, P.C.

(57) ABSTRACT

In one embodiment, a gas purification system is provided. The system includes a first solvent section having a first carbon dioxide ($CO_2$) absorber, a hydrogen sulfide ($H_2S$) absorber, and a first solvent path that routes a first solvent through the first $CO_2$ absorber and the $H_2S$ absorber. The gas purification system also includes a second solvent section having a second carbon dioxide ($CO_2$) absorber and a second solvent path that flows a second solvent through the second $CO_2$ absorber. The gas purification system has a gas path though the first and second solvent sections, wherein the first and second solvent paths are separate from one another, and the first and second solvents are different from one another.

24 Claims, 6 Drawing Sheets

OTHER PUBLICATIONS

Kohl, Arthur, and Richard Nielson, "Physical Solvents for Acid Gas Removal." Gas Purification. Houston, TX: Gulf Publishing Company, 1997, Chapter 14.
U.S. Appl. No. 12/566,613, filed Sep. 24, 2009.
U.S. Appl. No. 12/652,026, filed Jan. 4, 2010.
EP Search Report and Opinion dated Apr. 20, 2012 from corresponding EP Application No. 11163278.2.

* cited by examiner

SYSTEM FOR GAS PURIFICATION AND RECOVERY WITH MULTIPLE SOLVENTS

BACKGROUND OF THE INVENTION

The subject matter disclosed herein relates to new systems and methods for gas processing in a plant. More specifically, new systems and methods are disclosed for carbon and sulfur gas capture in integrated gasification combined cycle power plants and/or substitute natural gas production plants.

In general, integrated gasification combined cycle (IGCC) power plants are capable of generating energy from various hydrocarbon feedstock, such as coal. IGCC technology may convert the hydrocarbon feedstock into a gaseous mixture of carbon monoxide (CO) and hydrogen ($H_2$), i.e., syngas, by reaction with oxygen and steam in a gasifier. These gases may be processed, and utilized as fuel in a conventional combined cycle power plant. For example, the syngas may be fed into a combustor of a gas turbine of the IGCC power plant and ignited to power the gas turbine for use in the generation of electricity.

BRIEF DESCRIPTION OF THE INVENTION

Certain embodiments commensurate in scope with the originally claimed invention are summarized below. These embodiments are not intended to limit the scope of the present disclosure, but rather these embodiments are intended only to provide a brief summary of possible forms of an implementation. Indeed, the present approaches may encompass a variety of forms that may be similar to or different from the embodiments set forth below.

In a first embodiment, a gas purification system generally includes a first solvent section. The first solvent section includes a first carbon dioxide ($CO_2$) absorber, a hydrogen sulfide ($H_2S$) absorber, and a first solvent path that routes a first solvent through the first $CO_2$ absorber and the $H_2S$ absorber. The gas purification system also includes a second solvent section having a second carbon dioxide ($CO_2$) absorber and a second solvent path that flows a second solvent through the second $CO_2$ absorber. The gas purification system has a gas path though the first and second solvent sections, wherein the first and second solvent paths are separate from one another, and the first and second solvents are different from one another.

In a second embodiment, a gas purification system generally includes a first solvent section, and the first solvent section has a first solvent path and a first gas path. The first solvent path circulates a first solvent to remove hydrogen sulfide ($H_2S$) from the first gas path. The gas purification system also has a second solvent section having a second solvent path and a second gas path. The second solvent path is configured to remove carbon dioxide ($CO_2$) and water from the second gas path, and the first and second solvent paths are separate from one another. The first and second solvents are different from one another, and the first gas path leads to the second gas path.

In a third embodiment, a gas purification system has a first solvent section. The first solvent section includes a first carbon dioxide ($CO_2$) absorber, a hydrogen sulfide ($H_2S$) absorber, and a dimethyl ether of polyethylene glycol (DEPG) path that routes DEPG through the first $CO_2$ absorber and the $H_2S$ absorber. The gas purification system also includes a second solvent section having a second carbon dioxide ($CO_2$) absorber and a methanol path that flows methanol through the second $CO_2$ absorber. The gas purification system further includes a syngas path sequentially through the first and second solvent sections. The DEPG solvent path and the methanol solvent path are separate from one another.

BRIEF DESCRIPTION OF THE DRAWINGS

These and other features, aspects, and advantages of the present approaches will become better understood when the following detailed description is read with reference to the accompanying drawings in which like characters represent like parts throughout the drawings, wherein.

DETAILED DESCRIPTION OF EMBODIMENTS OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

The present embodiments generally provide a combination of multiple solvents for use in a gas processing unit of an integrated gasification combined cycle (IGCC) power plant and/or substitute natural gas production plant. Using the combination of multiple solvents, two or more sections may be used, with one solvent section dedicated to the capture and concentration of $H_2S$ from raw (untreated) syngas. Another solvent section is dedicated to carbon capture (i.e., removal of $CO_2$ from a untreated and/or sweetened syngas). In embodiments described herein, the liquid-vapor traffic is less than half of that required by some configurations, whose column diameters can exceed 14 feet. Using the combination of solvents, column and/or vessel diameters may be as small as 2 feet in diameter. The smaller diameter columns may allow more efficient liquid-vapor mixing, resulting in lower circulation rates suitable for syngas treatment. That is, a smaller solvent inventory may be suitable for treating an equal amount of syngas. The lower solvent flow rates and smaller conduits and vessels may allow a reduction in size of the various pumps that circulate the solvents through various pathways. In addition to or in lieu of embodiments using a lower flow rate and reduced-size equipment, the combination of solvents may allow a scale-up of the processes described herein. Thus, present embodiments may allow designs of systems with increased throughput and/or decreased capital cost.

In some embodiments, the combination of multiple solvents may dehydrate $H_2S$, $CO_2$, and the treated syngas that exits the gas processing unit. Such embodiments may allow for the elimination of a $CO_2$ dehydration section and backup $H_2S$ control section, which may reduce the capital expenses associated with the construction and operation of IGCC plants. Further, sections dedicated to $H_2S$ removal from syngas are separated from areas dedicated to $CO_2$ capture. Such embodiments may allow full continuity of IGCC plant operations even in situations where a pipeline compressor or the pipeline itself experiences a malfunction or is taken offline.

It should be noted that while reference is made to an IGCC plant in the present disclosure, the current approaches may be applicable to a number of embodiments, such as a substitute natural gas production plant. Indeed, any facility including gas processing and carbon capture sections may benefit from the embodiments disclosed herein.

Figure 1:
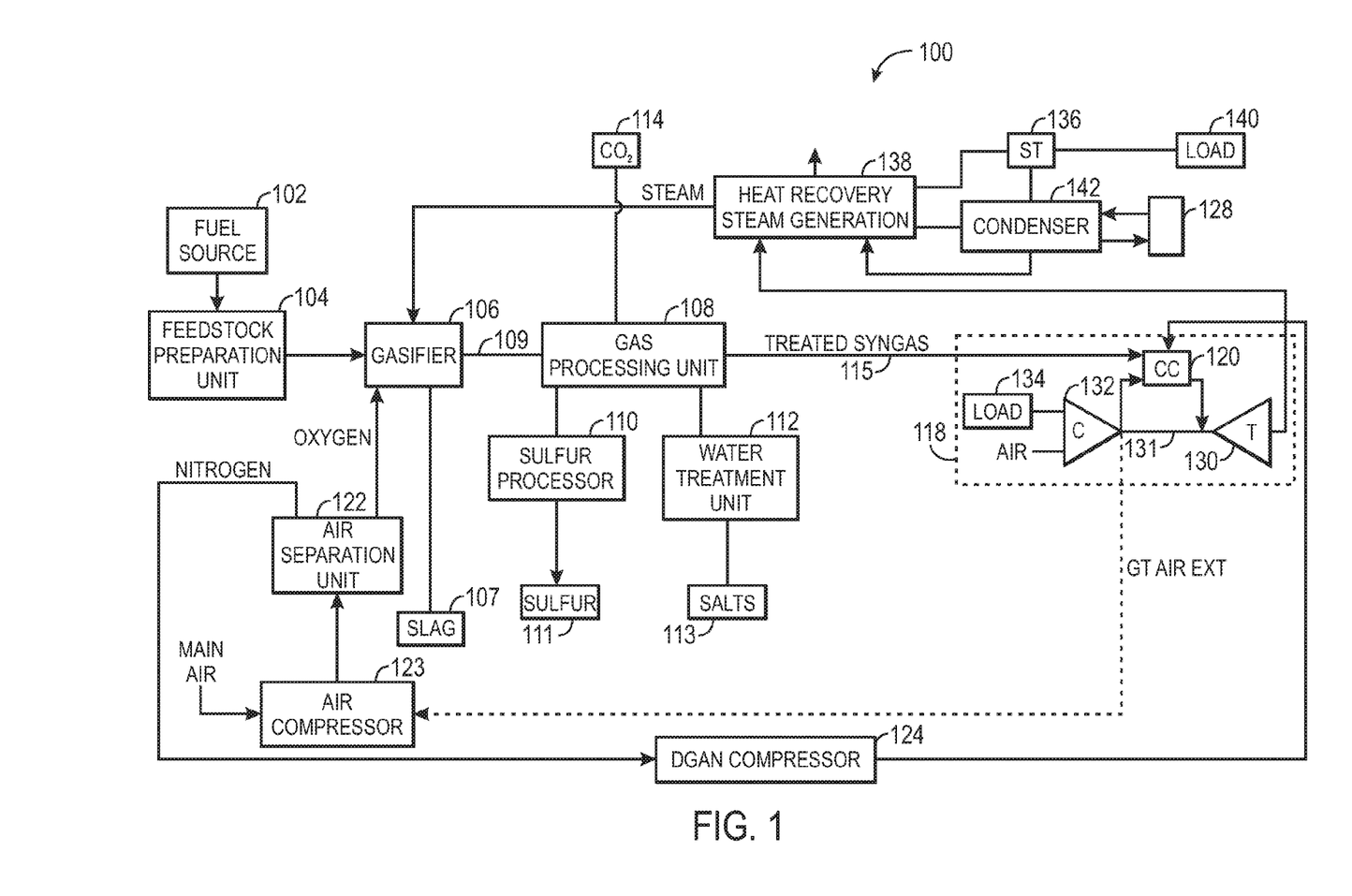
FIG. 1 is a schematic block diagram of an embodiment of an integrated gasification combined cycle (IGCC) power plant.

Moving now to the figures and referring initially to FIG. 1, a diagram of an embodiment of an integrated gasification combined cycle (IGCC) system 100 that may be powered by synthetic gas, i.e., syngas is illustrated. Elements of the IGCC system 100 may include a fuel source 102, such as a solid feed, that may be utilized as a source of energy for the IGCC. The fuel source 102 may include coal (including low sulfur content coal), petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide (CO) and hydrogen ($H_2$). This conversion may be accomplished by subjecting the feedstock to a controlled amount of steam and oxygen at elevated pressures, e.g., from approximately 20 bar to 85 bar, and temperatures, e.g., approximately 700° C.-1600° C., depending on the type of gasifier 106 utilized. The gasification process may include the feedstock undergoing a pyrolysis process, whereby the feedstock is heated. Temperatures inside the gasifier 106 may range from approximately 150° C. to 700° C. during the pyrolysis process, depending on the fuel source 102 utilized to generate the feedstock. The heating of the feedstock during the pyrolysis process may generate a solid, (e.g., char), and residue gases, (e.g., CO, $H_2$, and nitrogen ($N_2$)). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide ($CO_2$) and CO, which provides heat for the subsequent gasification reactions. The temperatures during the combustion process may range from approximately 700° C. to 1600° C. Next, steam may be introduced into the gasifier 106 during a gasification step. The char may react with the $CO_2$ and steam to produce CO and $H_2$ at temperatures ranging from approximately 800° C. to 1100° C. In essence, the gasifier utilizes steam and oxygen to allow some of the feedstock to be "burned" to produce CO and energy, which drives a second reaction that converts further feedstock to $H_2$ and additional $CO_2$.

In this way, a gas mixture is produced in the gasifier 106. This gas mixture may include up to approximately 90% (e.g., approximately 10, 20, 30, 40, 50, 60, 70, 75, 80, 85 or 90%) of carbon monoxide and hydrogen, as well as $CH_4$, HCl, HF, COS, $NH_3$, HCN, and $H_2S$ (based on the sulfur content of the feedstock). The gas mixture may be considered untreated, raw, or sour syngas and may include up to approximately 20 percent by volume $H_2S$. For example, the untreated syngas may include approximately 1, 5, 10, 15, or 20% by volume $H_2S$. The gasifier 106 may also generate slag 107, which may be a wet ash material. The slag 107 may be removed from the gasifier 106 and utilized as road base or as another building material. The gas mixture is then passed to a gas processing unit 108 via path 109 for removal of the various non-syngas components mentioned above.

In general, the gas processing unit 108 may receive the untreated syngas and remove a number of gases, including HCl, HF, COS, HCN, and $H_2S$ from the untreated syngas. According to the present embodiments, the gas processing unit 108 may utilize a combination of solvents (e.g., a combination of two or more solvents) to perform processes such as $H_2S$ absorption, $H_2S$ concentration, $CO_2$ absorption, $CO_2$ capture, $CO_2$ dehydration, and so forth. Further, the gas processing unit 108 may transmit $H_2S$-rich gas to a sulfur processor 110, such as a Claus reactor. The $H_2S$ gas may be processed by the sulfur processor 110 to generate sulfur 111 for export. Salts 113 may be separated from the untreated syngas via a water treatment unit 112 that utilizes water purification techniques to generate usable salts 113 from the untreated syngas.

As mentioned, the gas processing unit 108 may be configured to perform carbon dioxide ($CO_2$) capture. Using the combination of multiple solvents described below, $CO_2$ 114 is removed from the syngas and is transmitted to, for example, a pipeline for external transmission or for use in power generation processes. In some embodiments, the gas processing unit 108, utilizing the combination of multiple solvents, may reduce or altogether eliminate the need for a separate $CO_2$ dehydration unit. For example, dehydration of the $CO_2$ 114 that is separated from the syngas may be performed by any one of the combination of solvents. In one embodiment, the dehydration of the syngas may be performed by a solvent that is miscible with water at low temperatures (e.g., methanol, ethanol, and propanol). Subsequent and/or substantially simultaneously to some the processes described above, the gas exiting the gas processing unit 108 along path 115 may be considered a treated, sweetened, and/or purified syngas. That is, the syngas may be substantially free of sulfur, as well as residual gas components.

The treated syngas exiting the gas processing unit 108 may be of sufficient purity for use as fuel. For example, in some embodiments, the treated syngas exiting the gas processing unit 108 may include between approximately 0 and 10% (e.g., less than approximately 0, 1, 2, 3, 4, 5, 6, 7, 8, 9, or 10%) $CO_2$. The remaining volume may have anywhere from a 1:1 to 4:1 molar ratio of $H_2$ to CO. For example, the treated syngas may have a volumetric $H_2$ content of between about 40 and about 90% (e.g., 40, 45, 50, 55, 60, 65, 70, 75, 80, 85, or 90%), and a volumetric CO content of between about 10 and about 40% (e.g., 10, 15, 20, 25, 30, 35, or 40%). It should be noted that based on the level of $CO_2$ capture accomplished in the gas processing unit 108, the percentage of CO and $H_2$ in the treated syngas may increase. This treated syngas may be transmitted to a combustor 120, e.g., a combustion chamber, or a gas turbine engine 118 as combustible fuel.

Additionally, the treated syngas and/or captured $CO_2$ may be substantially free of $H_2S$. In embodiments using the combination of solvents, $H_2S$ levels in the treated syngas and/or in the captured (exported) $CO_2$ 114 may range between about 0 and 300 parts per million based on volume (ppmv). For example, the $H_2S$ may be present at levels of equal to or less than approximately 10, 20, 40, 60, 80, 100, 120, 150, 200, 250, or 300 ppmv. Further, as mentioned, the treated syngas and/or captured $CO_2$ may be substantially dehydrated (substantially free of $H_2O$). In some implementations, it may be desirable to perform such dehydration, as the treated syngas and/or captured $CO_2$ may have hydration levels of between approximately 2 and 10 mol %. At such levels, in one embodiment, the $CO_2$ and $H_2O$ may combine to make carbonic acid once the gas is compressed. In some situations, this may result in corrosion of internal components within one or more compressors and pipelines.

The IGCC system 100 may further include an air separation unit (ASU) 122. The ASU 122 may operate to separate air into component gases by, for example, distillation techniques. The ASU 122 may separate oxygen from air supplied by a supplemental air compressor 123. The ASU 122 may then transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
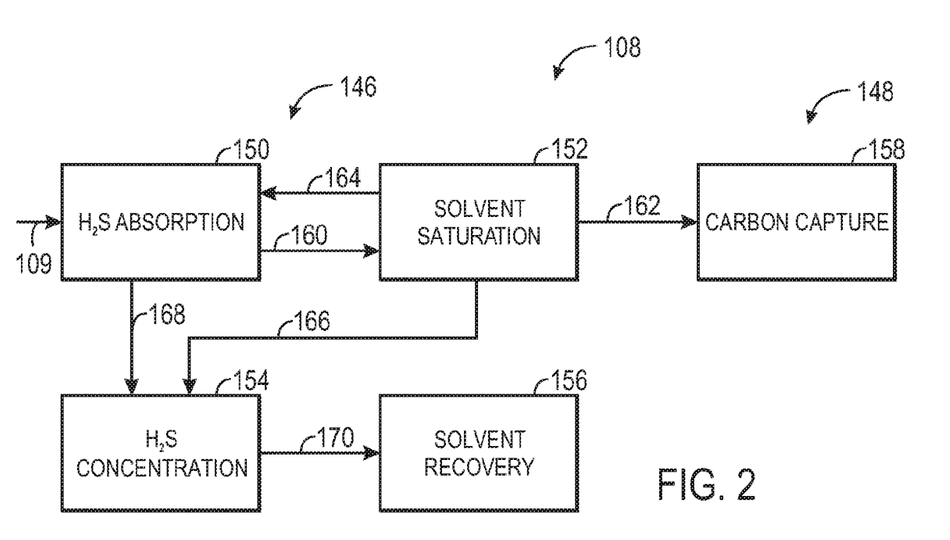
FIG. 2 is a schematic block diagram of an embodiment of the gas processing unit of FIG. 1.

As mentioned, the embodiments disclosed herein are generally directed towards using a combination of multiple solvents within at least a portion of the gas processing unit 108. FIG. 2 is a block diagram illustrating one embodiment of the gas processing unit 108 having two solvent sections. While the illustrated embodiment uses a two-solvent combination, the use of more than two sections and/or more than two solvents is also contemplated. The illustrated embodiment includes a first solvent section 146 and a second solvent section 148. The first solvent section 146 is configured to perform $H_2S$-related operations on the untreated syngas. Accordingly, the first solvent section 146 includes an $H_2S$ absorption unit 150, a solvent saturation unit 152, an $H_2S$ concentration unit 154, and a solvent recovery unit 156.

In present embodiments, the first solvent section 146 may be configured to flow a first solvent that is able to remove $H_2S$ and a portion of the $CO_2$ from the untreated syngas. Such solvents may include solvents that physically dissolve and mix with, rather than chemically react with the gases (e.g., $H_2S$) within the untreated syngas stream. That is, the first solvent is a physical solvent rather than a chemical solvent. Further, as the temperature of the first solvent is decreased, its ability to dissolve $H_2S$ and/or $CO_2$ may increase. Additionally, the ability of the first solvent to dissolve CO, $CH_4$ and $H_2$ may remain substantially unchanged at varying temperatures. Thus, at lower temperatures, acid gases may have a higher solubility in the first solvent than the main constituents of the syngas and/or substitute natural gas (CO, $CH_4$ and $H_2$). Thus, the first solvent section 146 may be operated at a lowered temperature compared to other parts of the IGCC system 100. For example, the first solvent section may be operated below approximately 25° C. (e.g., below approximately 25, 20, 15, 10, 5, 0, −10, or −15° C.). Accordingly, the first solvent may have a freezing point that allows it to be used at such temperatures. For example, the first solvent may have a freezing point between approximately 0 and −30° C. (e.g., approximately 0, −5, −10, −15, −20, −22, −24, −26, −28, or −30° C.). The first solvent may also have a minimum operating temperature of between approximately 10 and −20° C. (e.g., approximately 10, 5, 0, −5, −10, −12, −14, −16, −18, or −20° C.) due to the relationship between increased viscosity at lower temperatures and the flow rates suitable for gas (e.g., $H_2S$) capture.

During or subsequent to the $H_2S$ removal processes within the first solvent section 146, the mixture of first solvent and dissolved gases may be heated to effect gas separation from the first solvent, such as for solvent recycling. As such, the first solvent may be suitable for use at elevated temperatures. For example, the first solvent may have a boiling point at atmospheric pressure (1 atm) of between approximately 240 and 290° C. (e.g., approximately 240, 245, 250, 255, 260, 265, 270, 275, 280, 285 or 290° C.). The first solvent may also have a maximum operating temperature above at least approximately 65° C. (e.g., approximately 150, 155, 160, 165, 170, 175, 180, 190, or 195° C.).

As an example, the first solvent may be a dialkyl ether of a polyalkylene glycol. Such solvents may include dialkyl ethers of polyethylene glycol or polypropylene glycol. It should be noted that for the purposes of discussion, the prefix "poly", as used herein with regard to the first solvent, may denote a compound having more than one repeat unit, such as a dimer, trimer, tetramer, pentamer, and so on. In some embodiments, the first solvent may be represented by the formula $CH_3O(C_2H_4O)_mC_nH_{n+2}$, where m is between 2 and 9 (e.g., 2, 3, 4, 5, 6, 7, 8, and/or 9) and n is between 1 and 4 (e.g., 1, 2, 3, and/or 4). That is, the first solvent may be a mixture of compounds, or may be a single compound. For example, the first solvent may be a dimethyl ether of polyethylene glycol, a methyl ethyl ether of polyethylene glycol, a methyl isopropyl ether of polyethylene glycol, and/or a methyl tert-butyl ether of polyethylene glycol. For purposes of discussing the illustrated embodiment, the first solvent is a dimethyl ether of polyethylene glycol or a mixture of dimethyl ethers of polyethylene glycol (DEPG).

As illustrated, the second solvent section 148 is configured to flow a second solvent through a carbon capture section 158. The carbon capture section 158 may include a number of conduits, vessels, tanks, columns and so forth generally configured to remove $CO_2$ and $H_2O$ (water) from the syngas. In present embodiments, the second solvent is able to remove a substantial amount of the $CO_2$ from the syngas exiting the first solvent section 146. As with the first solvent, the second solvent may include physical solvents that physically dissolve and mix with, rather than chemically react with, the gases within the syngas stream. As the temperature of the second solvent is decreased, its ability to dissolve $H_2S$ and/or $CO_2$ may increase. Additionally, the ability of the second solvent to dissolve CO, $CH_4$ and $H_2$ may remain substantially unchanged at varying temperatures. At lower temperatures, acid gases may have a higher solubility in the second solvent than the main constituents of the syngas and/or substitute natural gas (CO, $CH_4$ and $H_2$).

In the illustrated embodiment, the untreated syngas enters the gas processing unit 108 via path 109. The syngas generally progresses from the H2S absorption unit 150, through a path 160, through the solvent saturation unit 152 and to the second solvent section 148 via path 162. Therefore, $H_2S$ is substantially removed from the syngas before the syngas enters the second solvent section 148. When the syngas exits the second solvent section 148, it may exit the gas processing unit 108 for use as fuel in the gas combustion turbine 118. In other embodiments, such as when the gas processing unit 108 is part of a substitute natural gas production facility, the syngas may be used for other processes, such as in a methanation section. As such, the second solvent section 148 may use a solvent that has a greater ability than the first solvent for removing non-syngas or non-natural gas components.

The second solvent may have a higher gas dissolving ability than the first solvent due to its ability to be used at a lower temperature. As noted above, in some embodiments by flowing the first and/or second solvent at a lower temperature, higher gas solubility at lower flow rates may be achieved. Further, in such embodiments where low flow rates are achieved, the lower amount of solvent may allow smaller equipment to be used. Thus, as an example, the second solvent may be used at a temperature at or below approximately 0° C. (e.g., between approximately −0 and −100° C.). In some embodiments, the operative temperature may be between approximately −10 and −70° C., −20 and −65° C., −30 and −55° C., −40 and −50° C. In one embodiment, the operating temperature may be between approximately −40 and −62° C. In some embodiments, due to the freezing point and/or viscosity of some solvents at lowered temperatures, the minimum operating temperature (e.g., the lowest temperature that a solvent may be used for the purposes of the present embodiments) of the second solvent may be between approximately −60 and −90° C. (e.g., approximately −60, −65, −70, −70.5, −75, −80, −85, or −90° C.). Due to such operating temperatures, the second solvent may have a freezing point that is substantially lower than the temperature of operation in the second solvent section 148. A substantially lower freezing point may allow the second solvent to have a suitable viscosity for a desired flow rate. Accordingly, the freezing point of the second solvent may be between approximately −130 and −80° C. For example, the freezing point of the second solvent may be approximately −130, −120, −110, −100, −90, or −80° C.

In some embodiments, the second solvent may be an organic solvent that is miscible with a number of compounds, such as water and alcohols. Additionally, the second solvent may be miscible with small organic molecules, which may allow the second solvent to remove compounds which may be undesirable for use as a gaseous fuel. Such non-fuel components may include ethers, acetone, benzene, toluene, and the like. In certain embodiments, the second solvent may be an alcohol. The alcohol may be chosen for some or all of the properties mentioned above. For example, the alcohol may be methanol, ethanol, isopropanol, n-propyl alcohol, or n-butanol. In embodiments where it may be desirable for the second solvent to have a higher boiling point and a higher minimum operating temperature, the second solvent may be t-butanol. For the purpose of the present discussion, the second solvent is methanol.

As noted above, the present embodiments include the use of multiple solvents within the GPU 108. In some embodiments, the use of multiple solvents may include the use of the mixture of two solvents, such as one solvent for $H_2S$ absorption and another for $CO_2$ absorption. According to the present disclosure, the mixture of solvents includes the first solvent and the second solvent. Therefore, using the solvents mentioned above with respect to the first and second solvent, the combination of first and second solvents may include a dimethyl ether of polyethylene glycol (DEPG) with methanol, DEPG with ethanol, DEPG with isopropanol, DEPG with n-propyl alcohol, or DEPG with n-butanol, or any combination thereof. In embodiments where it may be desirable for the second solvent to have a higher boiling point and a higher minimum operating temperature, the combination of solvents may be DEPG with t-butanol. In other embodiments, the combination of solvents may include a methyl ethyl ether of polyethylene glycol (MEPG) with methanol, MEPG with ethanol, MEPG with isopropanol, MEPG with n-propyl alcohol, or MEPG with n-butanol, or any combination thereof. In embodiments where it may be desirable for the second solvent to have a higher boiling point and a higher minimum operating temperature, the combination of solvents may be MEPG with t-butanol. In further embodiments, the combination of solvents may include a methyl isopropyl ether of polyethylene glycol (MIPG) with methanol, MIPG with ethanol, MIPG with isopropanol, MIPG with n-propyl alcohol, or MIPG with n-butanol, or any combination thereof. In embodiments where it may be desirable for the second solvent to have a higher boiling point and a higher minimum operating temperature, the combination of solvents may be MIPG with t-butanol. In still further embodiments, the combination of solvents may include a methyl tert-butyl ether of polyethylene glycol (MTBPG) with methanol, MTBPG with ethanol, MTBPG with isopropanol, MTBPG with n-propyl alcohol, or MTBPG with n-butanol, or any combination thereof. In embodiments where it may be desirable for the second solvent to have a higher boiling point and a higher minimum operating temperature, the combination of solvents may be MTBPG with t-butanol. Indeed, any combination of these solvents may be used according to the approaches described herein.

Again, using the mixture of two solvents within the GPU 108, it may be possible to produce a treated syngas that is substantially free of non-syngas compounds. Further, it may be possible to capture $H_2S$ of sufficient purity for use in the sulfur processor 110 and $CO_2$ of sufficient purity for use as an export gas. As mentioned, the syngas enters the gas processing unit 108 via path 109. Subsequently, a substantial amount of the $H_2S$ and some $CO_2$ is removed from the untreated syngas stream by a stream of DEPG flowing into the $H_2S$ absorption section 150 via path 164. The $H_2S$ absorption section 150 is discussed in further detail below.

It should be noted that the substantially pure DEPG from the solvent saturation section 152 may be bifurcated. The bifurcated flow of DEPG flows through two intermediate paths, one being the path 164 flowing into the $H_2S$ absorption section 150, and the other flowing into the $H_2S$ concentration section 154 via a path 166, which is discussed in further detail below. As the $H_2S$-rich DEPG flows into the $H_2S$ concentration section 154 via path 168, the $H_2S$ and some $CO_2$ removed from the untreated syngas is concentrated and substantially purified, such that the $H_2S$ may be of sufficient purity for later use. For example, the $H_2S$ may be exported to a Claus reactor contained within the sulfur processor 110. Further, the $CO_2$ that is removed from the untreated syngas in the $H_2S$ absorption section 150 may be separated, or may remain mixed with the $H_2S$ and serve as a carrier gas. In embodiments where the $CO_2$ is substantially separated, it may be directed to the carbon capture section 158 for combination with other $CO_2$ feedstocks or directed to the gasifier 106. Nevertheless, the $H_2S$ is carried by the DEPG through the $H_2S$ concentration section 154.

As the $H_2S$-rich DEPG exits the $H_2S$ concentration section 154, it is transferred to the solvent recovery section 156 via path 170. The solvent recovery section 156 may contain a number of areas and features such as vessels, columns, tanks, conduits, and so forth that are generally configured to extract the $H_2S$ from the DEPG to generate substantially pure recycled DEPG. Details of the solvent recovery section 156 are described below.

Figure 3:
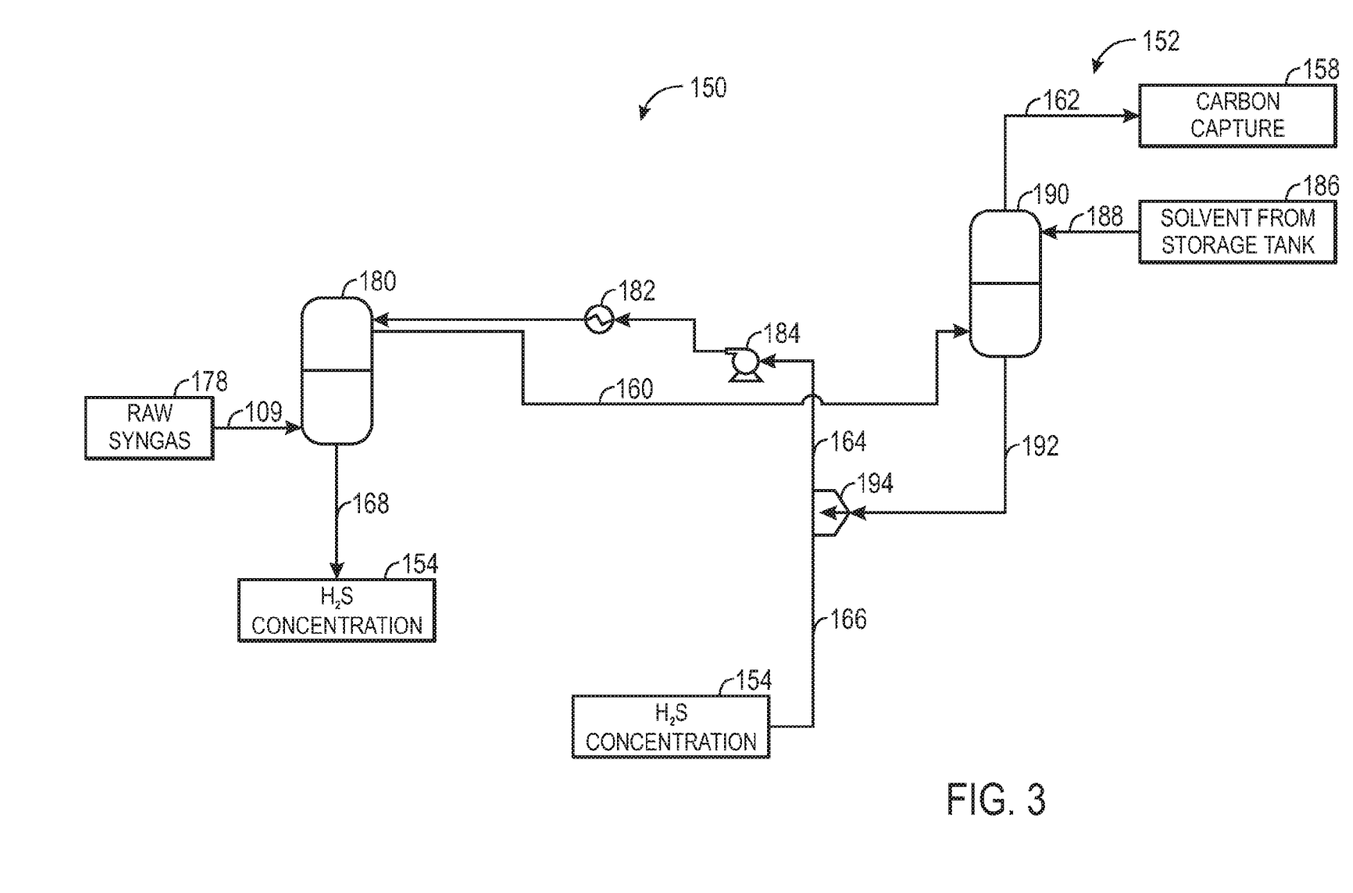
FIG. 3 is a schematic diagram of an embodiment of the configurations of the $H_2S$ absorption and solvent saturation sections illustrated in FIG. 2.

Moving now to FIG. 3, a schematic diagram of the $H_2S$ absorption section 150 and the solvent saturation section 152 of FIG. 2 is illustrated. In present embodiments, one solvent removes a substantial portion of the $H_2S$ from the syngas, while another solvent captures a substantial amount of $CO_2$ from the syngas. Together, the two solvents act as a combination to produce substantially pure $CO_2$ and syngas. Accordingly, as mentioned above, path 109 directs a stream of untreated syngas to the $H_2S$ absorption section 150. As the untreated syngas progresses through path 109, it enters a $H_2S$ absorber 180. The $H_2S$ absorber 180 may be a vessel, such as a column or elongated tank that is configured to allow mixing of the untreated syngas with the stream of DEPG flowing through path 164. In the illustrated embodiment, the untreated syngas enters the $H_2S$ absorber 180 at a lower area of the $H_2S$ absorber 180. Conversely, the DEPG enters into the $H_2S$ absorber 180 at an upper area. As a result of this configuration, the untreated syngas is allowed to efficiently mix with the DEPG via a countercurrent effect. As the DEPG mixes with the untreated syngas, it removes a substantial portion of the $H_2S$ from the untreated syngas along with some $CO_2$. Thus, a stream of sweetened syngas (substantially removed of $H_2S$) exits the $H_2S$ absorber 180 via the path 160.

As previously discussed, DEPG, which in the illustrated embodiment is the first solvent, may have increased performance at a reduced temperature (lower than standard temperature). Additionally, the DEPG may also have increased performance at higher pressures (higher than standard pressure). That is, sulfur gases in the untreated syngas may have a higher solubility in DEPG that is cooled and/or pressurized than DEPG which is at standard temperature and pressure (STP). Accordingly, the $H_2S$ absorption section 150 may also include a heat exchanger 182 (e.g., a chiller) and a pump 184 for generating DEPG suitable for such uses.

During operation, substantially pure DEPG from a storage tank 186 may be directed via path 188 to a solvent saturation column 190, which may be a $CO_2$ absorber (e.g., a first $CO_2$ absorber). In the solvent saturation column 190, the DEPG enters a top area of the column 190. The stream of sweetened syngas flowing though path 160 enters a bottom portion of the solvent saturation column 190. Mixing produced by a countercurrent between the downward-flowing stream of substantially pure DEPG and the upward-rising sweetened syngas causes a stream of $CO_2$-saturated DEPG to exit the column 190 via path 192. In some embodiments, the sweetened syngas flowing through path 192 may have at most between approximately 5 and 55 ppmv $H_2S$ (e.g., approximately 5, 10, 15, 20, 25, 30, 35, 40, 45, 50, or 55 ppmv). In some embodiments, the DEPG extracts at least a portion of $CO_2$ from the sweetened syngas. It should be noted that the syngas flowing through path 162 may have a substantial amount of $CO_2$ that is not extracted by the DEPG at either the $H_2S$ absorber 180 or the solvent saturation column 190 (the first $CO_2$ absorber). Accordingly, the syngas exiting an upper portion of the solvent saturation column 190 via path 162 may still contain a substantial amount of $CO_2$ that may be captured at a later stage. For example, the path 162 leads to the second solvent section 148 containing the carbon capture section 158.

As mentioned with respect to FIG. 2, the stream of DEPG is bifurcated. A portion of the $CO_2$-saturated DEPG is directed to the $H_2S$ concentration section 154 via intermediate pathway 166. The remaining portion is directed to the $H_2S$ absorption section 150 via intermediate pathway 164. That is, the path 192 directs the $CO_2$-saturated DEPG to a split 194, where the DEPG is bifurcated into the two intermediate pathways 164 and 166. It should be noted the pressure of the $CO_2$-saturated DEPG may begin to fall as it flows through the intermediate path 164. Accordingly, the intermediate path 164 leads to the pump 184, where the stream of $CO_2$-saturated DEPG is re-pressurized and at least partially motivated toward the $H_2S$ absorber 180. For example, the DEPG may be re-pressurized to between approximately 400 and 600 pounds per square inch (psi). That is, the DEPG flowing into the $H_2S$ absorber 180 may be approximately 400, 420, 440, 460, 480, 500, 520, 540, 560, 580, or 600 psi. By re-pressurizing the DEPG, the ability of the DEPG to dissolve sulfur gases may be increased compared to DEPG at standard pressure. It should be noted that the temperature of the $CO_2$-saturated DEPG may also be elevated. Such an elevation in temperature may be due to the heat of dissolution caused by the extraction of the $CO_2$ from the sweetened syngas into the DEPG. Accordingly, the warm, hot, or heated $CO_2$-saturated DEPG may flow through the heat exchanger 182, where its temperature is reduced. For example, the temperature of the $CO_2$-saturated DEPG may be reduced to between approximately 10 and 0° C. (e.g., approximately 10, 5, or 0° C.).

By cooling the DEPG and therefore increasing its ability to extract and dissolve $H_2S$, a lower amount of DEPG (a lower flow rate) may be suitable to remove an equal or greater quantity of $H_2S$ from the untreated syngas than if the DEPG remained at standard temperature or higher. Further, using the combination of solvents described herein, the present embodiments provide one solvent for $H_2S$ removal and another for $CO_2$ removal. In the illustrated embodiment, the DEPG removes substantially all of the $H_2S$ from the untreated syngas, while methanol (MeOH) removes substantially all of the remaining $CO_2$ from the sweetened syngas. Thus, the DEPG section 146 is generally configured to remove $H_2S$, rather than both $H_2S$ and $CO_2$. However, it should be noted that DEPG may remove at least a portion of the $CO_2$ from the untreated and/or sweetened syngas. As a result of such a configuration, the vessels, conduits, tanks, and so forth of the first solvent section 146 may be reduced in size compared to conventional designs, while substantially removing all $H_2S$ from an equal amount of untreated syngas. For example, according to present embodiments, the $H_2S$ absorber 180 (and all other columns of similar size) may be between approximately 1 and 4 feet in diameter (e.g., approximately 1, 2, 3, or 4 feet), rather than the 14 to 15-foot diameter used in conventional designs. The reduction in vessel size may be due, at least partially, to the reduction in flow rate suitable for given quantities of $H_2S$ removal. That is, using the combination of solvents, the flow rate of the cooled DEPG through the first solvent section 146 may be between approximately 500 and 3000 gallons per minute (GPM), rather than between approximately 20,000 and 26,000 GPM (e.g., 24,000 GPM) if only DEPG were used for both $H_2S$ and $CO_2$ removal. For example, the flow rate of DEPG may be approximately 500, 600, 700, 800, 900, 1000, 1500, 2000, 2500, or 3000 GPM. It should be noted, however, that the pressure and amounts of each of the combination of solvents are a function of untreated syngas feed into the $H_2S$ absorber 180 as well as the $H_2S$ and $CO_2$ content in the untreated syngas.

Figure 4:
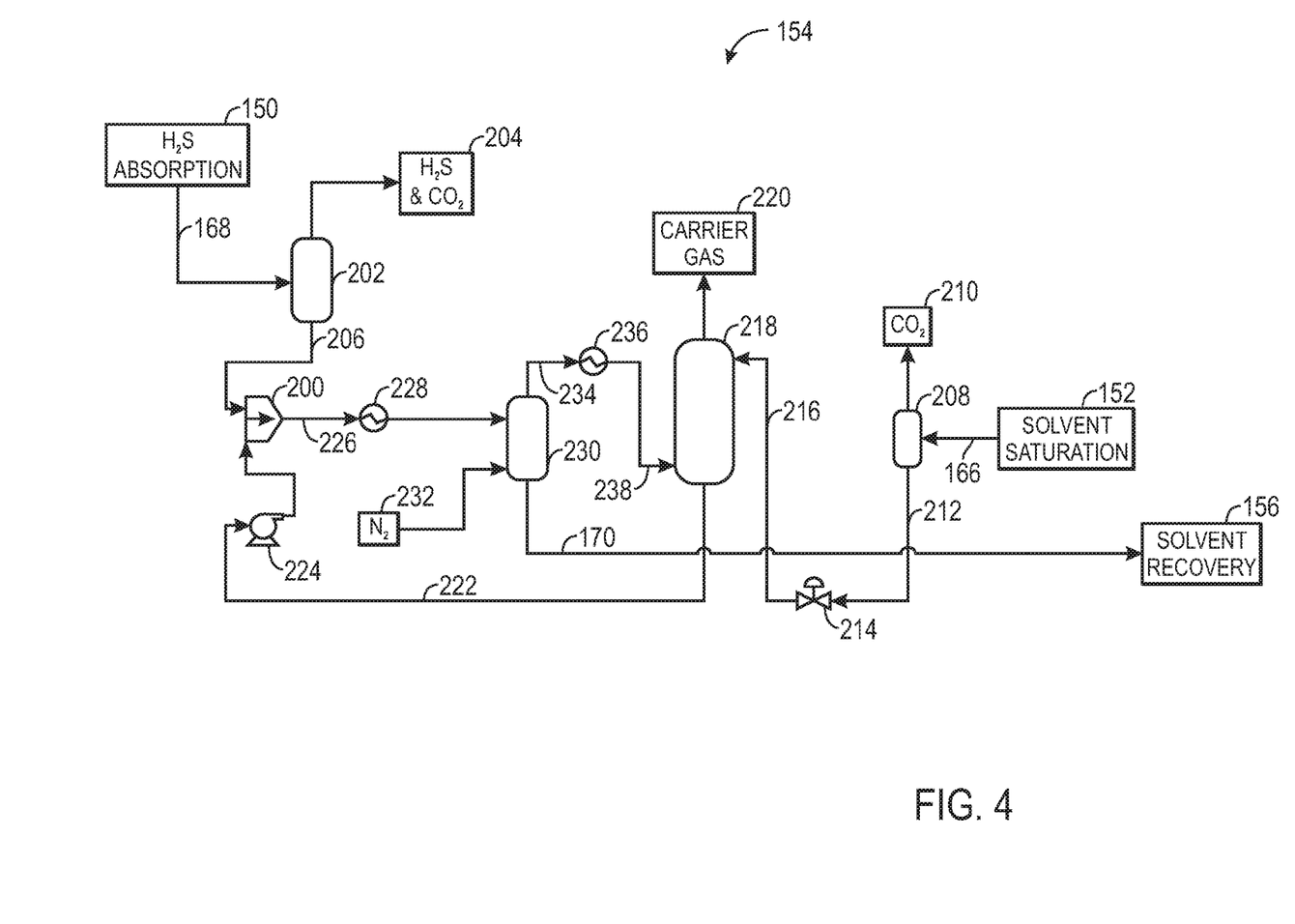
FIG. 4 is a schematic diagram of an embodiment of the configuration of the $H_2S$ concentration section illustrated in FIG. 2.

Nevertheless, upon leaving the heat exchanger 182, the $CO_2$-saturated DEPG flowing through path 164 may then enter the $H_2S$ absorber 180. Again, the $H_2S$-rich DEPG exiting the $H_2S$ absorber 180 is directed to the $H_2S$ concentration section 154 via path 168. FIG. 4 is a schematic diagram of the $H_2S$ concentration section 154 of FIG. 2. Again, the embodiments described herein provide a combination of solvents that, when used together, are able to separate and concentrate $H_2S$ and $CO_2$. These separated and concentrated gases may be considered value-added streams that are available for export or further processing. It should be noted that the first solvent, DEPG, enters into the $H_2S$ concentration section 154 from two different areas, as illustrated in FIG. 2. That is, $H_2S$-saturated DEPG that is rich in $CO_2$ is introduced into the $H_2S$ concentration section 154 via path 168, and $CO_2$-saturated DEPG that is substantially free of $H_2S$ is introduced into the $H_2S$ concentration section 154 via path 166. The two points of entry may be considered to be a result of the two intermediate paths 166, 164, which eventually converge at a mixing connection 200. Path 164, as mentioned above, flows DEPG through a number of vessels generally configured to allow the DEPG to extract substantially all of the $H_2S$ from the untreated syngas. Path 166 flows the $CO_2$-saturated DEPG through a number of separate vessels in the $H_2S$ concentration section 154 that are generally configured to remove $CO_2$ as well as saturate the DEPG with $H_2S$.

Thus, the path 164 is a first intermediate path that flows DEPG through the $H_2S$ absorber 180 contained within the $H_2S$ absorption section 150 and the path 168 exiting the $H_2S$ absorber 180. The path 164 (FIG. 3) also flows the DEPG through a flash vessel 202 that is configured to remove a first portion of $CO_2$ for capture 204 from the $H_2S$-saturated DEPG and a path 206 configured to flow DEPG which contains the balance of the CO2 and H2S at a concentration of between approximately 20 and 40% $CO_2$ and 0.1 to 1.0% $H_2S$ to the mixing connection 200. It should be noted that the DEPG flowing along the first intermediate path (path 164 in FIG. 3) may also contain non-syngas components such as water and some acid gases, albeit in low quantities that may not effect the ability of the $H_2S$ to be converted to sulfur 111.

As mentioned, the $H_2S$-rich and $CO_2$-rich DEPG exits the $H_2S$ absorption section 150 via path 168 and flows to the flash vessel 202. The flash vessel 202 reduces the pressure of the $H_2S$ and $CO_2$-rich DEPG, such that the $H_2S$-rich and $CO_2$ are brought out of solution (i.e., escape), exiting a top portion of the vessel 202. The pressure within the flash vessel 202 may be approximately 50, 100, 150, 200, 250, or 300 psi less than the $H_2S$ absorber 180. The amounts of $H_2S$ and $CO_2$ that escape the DEPG may depend on the size of the vessel, the pressure drop from the $H_2S$ absorber 180 to the flash vessel 202, the temperature of the vessel 202, and so forth. As the $H_2S$-rich and $CO_2$-rich DEPG enters the flash vessel 202, the mixture undergoes a flash event (e.g., a release of dissolved vapor in a solvent due to a pressure reduction). The flash vessel 202 may be a tank, a column, an area of increased conduit size, or any such vessel capable of reducing the pressure of the flowing DEPG mixture. Again, the $H_2S$-lean and $CO_2$-lean DEPG mixture resulting from the flash event is provided to the mixing connection 200, where it mixes with the DEPG flowing from a second intermediate path.

The path 166 from the solvent saturation section 152 may be considered the second intermediate path. The path 166 may flow DEPG to a flash vessel 208 that is configured to remove $CO_2$ 210 from the $CO_2$-saturated DEPG stream. The $CO_2$ may be exported to the carbon capture section 158 or another area of the plant. The vessel 208 may be a tank, column, or an area having an enlarged conduit. The $CO_2$-stripped DEPG may exit the flash vessel 208 via path 212, where it is routed to a valve 214. The valve 214 may be any valve capable of pressure modulation such as a v-ball valve, diaphragm valve, and the like. In the embodiment depicted, the valve 214 is a diaphragm valve. The valve 214, during operation, reduces the pressure of the flowing DEPG to reduce its temperature. The temperature may be reduced to between approximately 10 and $-20°$ C. (e.g., approximately 10, 5, 0, $-5$, $-10$, $-12$, $-14$, $-16$, $-18$, or $-20°$ C.). The temperature reduction may also be measured by a percentage. That is, the temperature may be reduced by between approximately 5 and 300% (e.g., approximately 5, 10, 20, 30, 40, 50, 60, 70, 75, 80, 85, 90, 100, 150, 200, 250, or 300%).

The cooled and pressure-reduced DEPG then flows through a path 216, where it may entrain a $H_2S$ vapor stream in a $H_2S$ concentrator 218. The $H_2S$ concentrator 218 is generally configured to provide a vessel for mixing DEPG with little to no entrained gas flowing through path 216 with gases (e.g., $H_2S$) from the $H_2S$ absorption section 150. The DEPG solvent then exits the $H_2S$ concentrator 218 as $H_2S$-rich DEPG via path 222. The $H_2S$-rich DEPG is then re-pressurized, for example to approximately 400, 420, 440, 460, 480, 500, 520, 540, 560, 580, or 600 psi by a pump 224. The pump 224 may additionally at least partially provide a motive force for providing the $H_2S$-rich DEPG originating from the second intermediate path (path 166) to the mixing connection 200. In some embodiments, the mixing connection 200 may be a mixing vessel with an inlet for the $H_2S$-rich DEPG from the second intermediate path (path 166) and exiting the $H_2S$ concentrator 218 and an inlet for the $H_2S$-lean and $CO_2$-lean DEPG from the first intermediate path (path 164 in FIG. 3) that has been flashed in flash vessel 202. At the mixing connection 200, the two intermediate paths may be considered to converge, with a path 226 exiting the mixing connection 200 and flowing a DEPG mixture that has a substantial amount of $H_2S$ and some $CO_2$. For example, the DEPG mixture flowing though the path 226 may entrain between approximately 5 and 20% $H_2S$ (e.g., 5, 10, 15, or 20% $H_2S$) by volume.

As the DEPG mixture flows through path 226, its temperature is increased at a heat exchanger 228 for eventual separation in a $H_2S$ flasher 230. For example, the DEPG mixture may be heated to between approximately 250 and 400° F. (e.g., approximately 300 and 350° F.). Additionally, a stream of stripping nitrogen ($N_2$) 232 is provided to the $H_2S$ flasher 230 to aid in separating the $CO_2$ from the DEPG and $H_2S$. The $H_2S$ flasher 230 allows a countercurrent flow between the downward-flowing DEPG mixture and the rising $N_2$ stream while reducing pressure, which allows a certain selectivity for removing $CO_2$ from the DEPG. That is, due to the higher solubility of $H_2S$ versus $CO_2$ in DEPG (e.g., approximately 9 times higher at 25° C. and 1 atm), the $H_2S$ flasher 230 allows the removal of a substantial portion of the $CO_2$ while allowing the DEPG to retain a substantial portion of the $H_2S$. Therefore, a stream of $N_2$, $CO_2$, and $H_2S$ exit an upper portion of the $H_2S$ flasher 230 into path 234, while a stream of $H_2S$-rich, $CO_2$-lean DEPG exits a lower portion of the $H_2S$ flasher 230 into the path 170. In the illustrated embodiment, the path 170 directs the stream of $H_2S$-rich DEPG to the solvent recovery section 156.

The gaseous stream of $N_2$, $CO_2$, and $H_2S$ flowing through path 234 is then re-cooled at a heat exchanger 236. As an example, the gaseous mixture is cooled to between approximately 30 and 90° F. (e.g., approximately 35, 40, 50, 60, 70, 80 or 90° F.). The cooled gaseous stream flows through a path 238 and enters into a lower portion of the $H_2S$ concentrator 218. Therefore, the $H_2S$ concentrator 218 allows a countercurrent flow of the upward-rising gaseous mixture from path 238 to interact with the downward-flowing DEPG from path 216. To encourage favorable interactions, for example mass transfer, the $H_2S$ concentrator 218 may contain a dispersed packing material. The dispersed packing material may allow an increased surface area for vapor-liquid interactions. As noted above, due to DEPG's increased solvating ability of $H_2S$ over $CO_2$, a certain amount of selectivity may be obtained. Thus, the carrier gas 220 contains $N_2$ and $CO_2$, and may be directed to a number of areas within the plant, for example the gasifier 106 in FIG. 1. Further, the selectivity of the DEPG allows it to become rich in $H_2S$ over a number of iterations as it progresses through the loop formed by the paths 222, 226, 234, and 238. Again, the $H_2S$-rich DEPG is directed to the solvent recovery section 156 via path 170.

Figure 5:
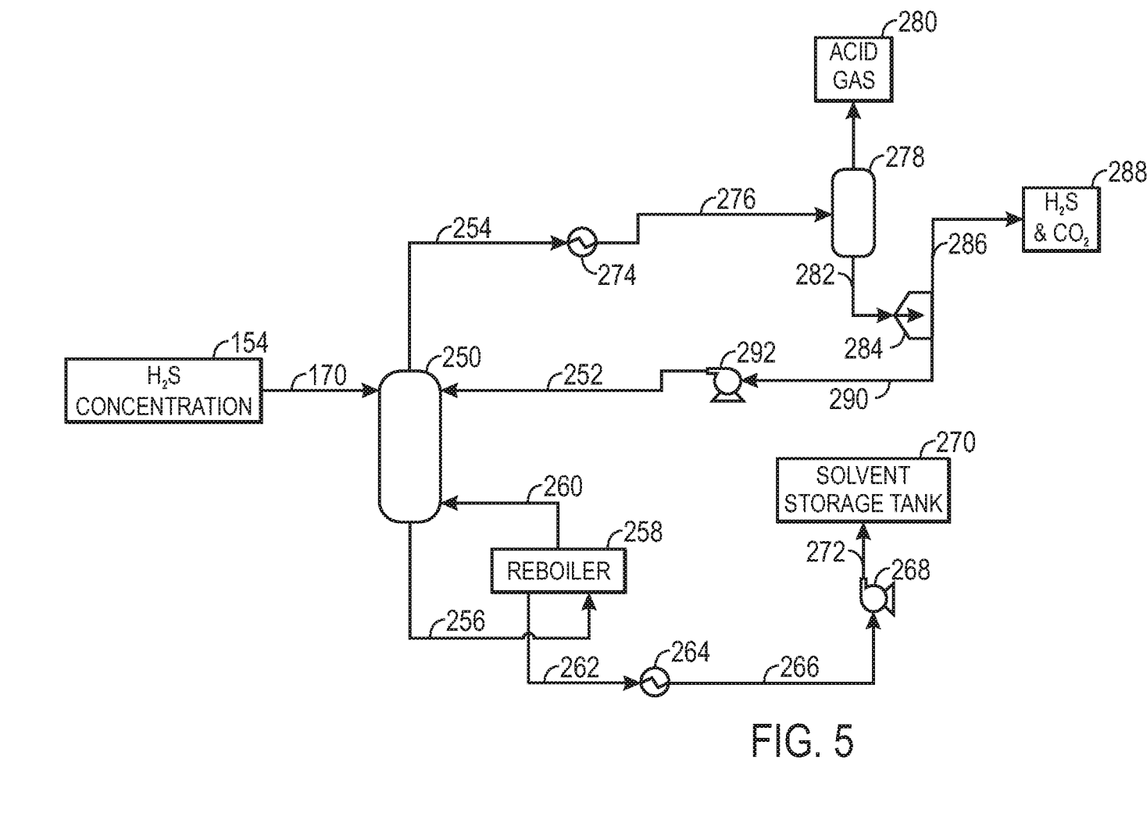
FIG. 5 is a schematic diagram of an embodiment of the configuration of the solvent recovery section illustrated in FIG. 2.

FIG. 5 illustrates a schematic diagram of the solvent recovery section 156 of FIG. 2. The solvent recovery section 156 generally includes features configured to separate $H_2S$, water, and other acid gases from the DEPG. The $H_2S$-rich DEPG flowing through the path 170 into the solvent recovery section 156 may contain between approximately 15 and 30% $H_2S$ (e.g., approximately 15, 20, 25, or 30%). The path 170 flows the $H_2S$-rich DEPG into a solvent recovery column 250, which also receives a stream of reflux water via path 252. The solvent recovery column 250 may have an elevated temperature and/or reduced pressure to effect the escape of $H_2S$ from the DEPG. For example, the solvent recovery column 250 may have a temperature between approximately 100 and 300° F. (e.g., 100, 120, 140, 160, 180, 200, 220, 240, 260, 280 or 300° F.). The pressure within the solvent recovery column 250 may be between approximately 1 and 30 psi (e.g., 1, 5, 10, 15, 20, 25, or 30 psi). The stream of reflux water and the $H_2S$-rich DEPG interact at the elevated temperature and/or reduced pressure to generate a stream of $H_2S$ and water (e.g., steam) that exits an upper portion of the solvent recovery column 250 into the path 254. In some embodiments, the reflux water may aid in extraction of the $H_2S$ from the DEPG and may also prevent the DEPG from boiling in the solvent recovery column 250.

$H_2S$-lean DEPG exits a bottom portion of the solvent recovery column 250 into a path 256, which leads to a reboiler 258. The reboiler 258 is configured to re-heat the DEPG and any remaining $H_2S$, providing a stream of $H_2S$ vapor 260 to the solvent recovery column 250. Additionally, the reboiler 258 produces a stream of heated DEPG that is sent through a path 262 and to a heat exchanger 264. Thus, the reboiler 258 is configured to separate, via heat, any remaining $H_2S$ from the DEPG. The heated DEPG is cooled in the heat exchanger 264 to about ambient temperature (standard temperature) to generate a stream of room temperature DEPG that flows along a path 266. A pump 268 provides at least a portion of a motive force that directs the room temperature DEPG to a solvent storage tank 270 via a path 272. It should be noted that the solvent storage tank 270 may provide fresh (recycled)

DEPG to various sections of the gas processing unit 108, such as the solvent saturation section 152 in FIGS. 2 and 3.

The stream of $H_2S$ and steam flowing through 254 may be at or slightly below the temperature of the solvent recovery column 250 (e.g., 100, 120, 140, 160, 180, 200, 220, 240, 260, 280 or 300° F.). Accordingly, the $H_2S$ and steam may be cooled in a heat exchanger 274 to allow more effective separation of the $H_2S$ from the water and for heat recovery. A cooled stream of $H_2S$ and steam then flows through a path 276 to a separation vessel 278, which may be a flash tank or a conduit area having reduced pressure. The separation vessel 278 may be configured to allow any water from stream 276 to condense, while releasing any entrained $H_2S$. Indeed, the stream of $H_2S$ and water may be biphasic (unmixed), such that when the mixture enters the separation vessel 278, the $H_2S$ quickly vaporizes off the surface of the water. The $H_2S$ and any residual amounts of acid gases which are present exit an upper portion of the separation vessel 278 to generate a stream of acid gas 280. The water exits a lower portion of the separation vessel 278 as a stream 282, which is directed to a split 284. The split 284 directs one portion of the water to a path 286, which transmits the water to a water purge 288 for storage or export to another portion of the plant. Another portion of the water is directed to a path 290, which leads back towards the solvent saturation column 250. The water is then at least partially motivated by a pump 292 through the path 252 to provide a stream of recycled reflux water to the solvent saturation column 250.

As noted above, the present embodiments provide a combination of solvents for $H_2S$ and $CO_2$ capture, purification, and concentration within the gas processing unit 108. As noted above with respect to FIG. 2, the untreated syngas entering the first solvent section 146 via path 109 may have a substantial amount of $H_2S$ present within the syngas. Upon exiting the first solvent section 146, which as described above may utilize DEPG, the syngas may be considered a sweetened syngas (i.e., syngas that is substantially free of $H_2S$). Further, the sweetened syngas flowing through the path 162 to the second solvent section 148 may contain a substantial amount of entrained $CO_2$. Accordingly, the carbon capture section 158 within the second solvent section 148 may utilize a solvent with a higher $CO_2$ solubility than the first solvent used in the first solvent section 146. Accordingly, the second solvent, which for the purposes of the present discussion is methanol (MeOH), may have a higher solubility for $CO_2$ than DEPG. For example, in some embodiments MeOH may have a $CO_2$ solubility that is approximately 3.7 times higher than DEPG (approximately 13.5 vol gas/vol solvent for MeOH at 1 atm and −25° C. versus 3.63 vol gas/vol solvent for DEPG at 1 atm and 25° C.). Accordingly, the sweetened syngas that flows into the second solvent section 148 may flow through a series of vessels, columns, tanks and so forth that are configured to allow MeOH to extract $CO_2$ from the syngas. Further, the extracted $CO_2$ is dehydrated by the MeOH, which may eliminate the need for a separate $CO_2$ dehydrator in the system 100.

Figure 6:
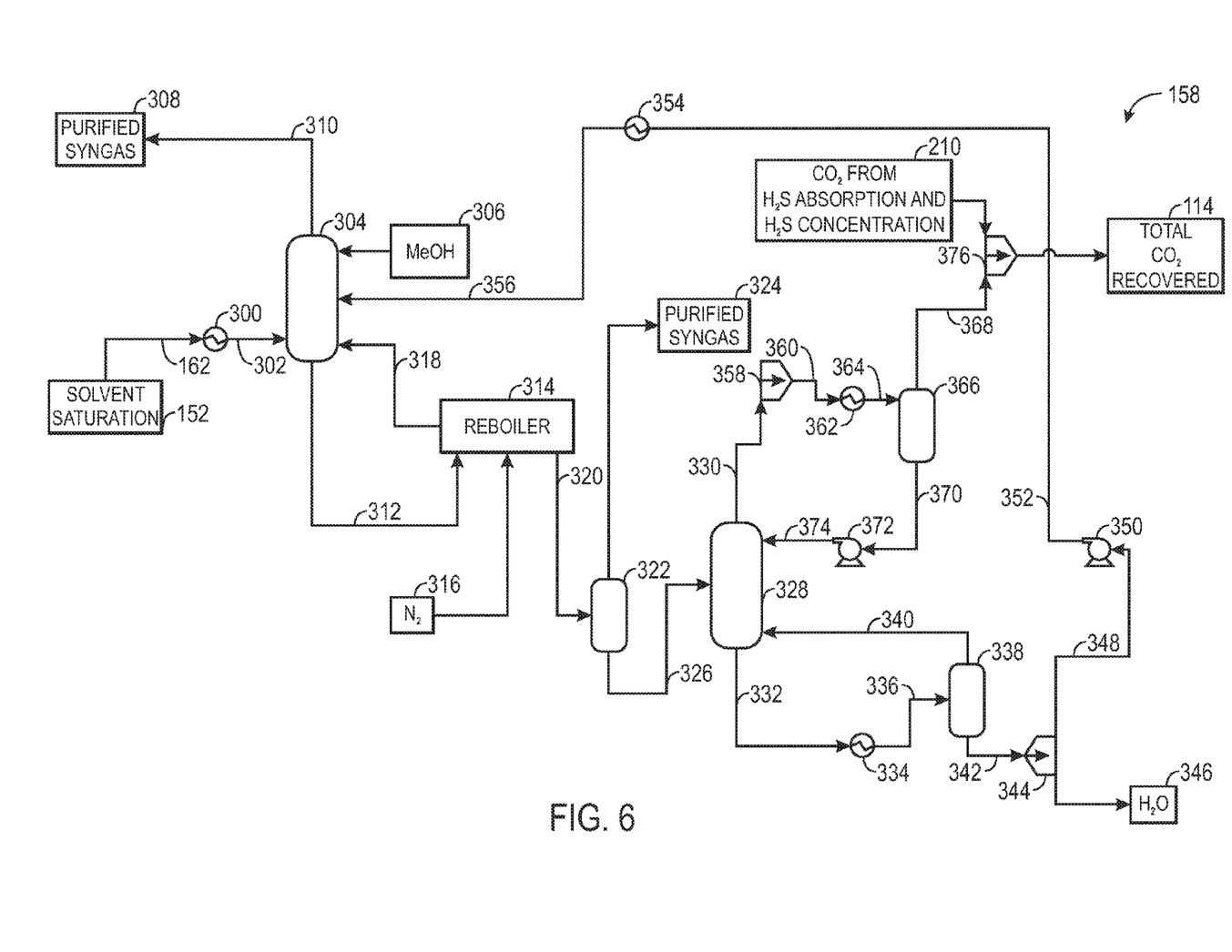
FIG. 6 is a schematic diagram of an embodiment of the configuration of the $CO_2$ capture section illustrated in FIG. 2.

FIG. 6 is a schematic diagram of the carbon capture section 158 of the second solvent section 148 of FIG. 2. As mentioned, the carbon capture section 158 may include a series of vessels configured to allow countercurrent flow between MeOH and the sweetened syngas. Accordingly, a stream of sweetened syngas flows through path 162 to a heat exchanger 300. The heat exchanger 300 may cool the stream of sweetened syngas to a temperature between approximately −20 and 20° F. (e.g., approximately −20, −15, −10, 0, 10, 20° F.). The cooled stream of sweetened syngas then flows through a path 302 and into a lower portion of a $CO_2$ absorption column 304 (i.e., a second $CO_2$ absorber in the gas processing unit 108). A stream of cooled methanol 306 having a temperature approximately between −10 and −70° C. (e.g., between approximately −20 and −65° C., −30 and −55° C., or −40 and −50° C.) also enters an upper portion of the $CO_2$ absorber 304. The downward-flowing cooled MeOH mixes, via a countercurrent, with the upward-flowing sweetened syngas in the $CO_2$ absorber 304. The mixing generates a stream of syngas 308 that is substantially free of $H_2S$ and $CO_2$, which exits an upper portion of the $CO_2$ absorber 304 via path 310. The syngas entering into the $CO_2$ absorber is also substantially dehydrated by the downward-flowing cooled MeOH. For example, at least approximately 90, 91, 92, 93, 94, 95, 96, 97, 98, or 99% or greater of the water in the syngas is removed when generating the purified syngas 308.

A stream of $CO_2$-rich MeOH exits a bottom portion of the $CO_2$ absorber 304 via path 312. The stream of $CO_2$-rich MeOH 312 may also contain a small amount of syngas (CO and $H_2$) and water, and may be directed to a reboiler 314. In general, the reboiler 314 is configured to remove remaining entrained syngas components by increasing the temperature of the stream from path 312 to a point where syngas may begin to escape the MeOH. Accordingly, the reboiler 314 may gradually heat the stream from path 312 to a temperature between approximately 150 and 350° F. (e.g., approximately 150, 200, 250, 300, or 350° F.). A stream of stripping nitrogen 316 is also delivered to the reboiler 314 to facilitate the extraction of the syngas components from the MeOH. That is, the reboiler 314 may vaporize a substantial portion of the remaining syngas and deliver a stream of syngas and $N_2$ along with some MeOH vapor and $CO_2$ back to the $CO_2$ absorber 304 via path 318. As illustrated, the path 318 may enter the $CO_2$ absorber 304 at an area proximate a bottom portion. A $CO_2$-saturated stream of heated MeOH may exit the reboiler 314 via path 320.

The stream of $CO_2$-saturated and heated MeOH may enter into a flash vessel 322, which is generally configured to separate the remaining syngas that is entrained in the MeOH. The heated MeOH stream entering into a lower portion of the vessel 322 may experience a flash event as the stream encounters the vessel 322, which may be a tank having a lower pressure than the MeOH stream. For example, the syngas stream may be at a pressure between approximately 300 and 600 psi (e.g., approximately 300, 350, 400, 450, 500, 550, or 600 psi), and the flash vessel 322 may be set at a pressure of between approximately 10 and 400 psi (e.g., approximately 10, 15, 20, 25, 50, 100, 150, 200, 250, 300, 350, or 400 psi). While the flash vessel 322 may provide a pressure drop suitable for syngas escape, the vessel 322 may also be configured such that nearly all (e.g., at least approximately 99%) of the $CO_2$ remains entrained in the MeOH. Thus, a stream of purified syngas 324 may exit an upper portion of the vessel 322, while a stream of reduced pressure $CO_2$-saturated MeOH exits a lower portion into a path 326. It should be noted that the purified syngas 324 exiting the flash vessel 322 may be between approximately 1 and 20% of the purified syngas 308 that is recovered at the $CO_2$ absorber 304. For example, the purified syngas 324 may be approximately 1, 5, 10, 15, or 20% of what is recovered at the $CO_2$ absorber 304.

The $CO_2$-saturated MeOH stream flowing through the path 326 may then enter a $CO_2$ recovery column 328. The $CO_2$ recovery column 328 may be configured to remove at least a portion of the $CO_2$ entrained within the MeOH. For example, the $CO_2$ recovery column 328 may remove at least approximately 20, 30, 40, or 50% of the $CO_2$ within the MeOH by heating and/or reducing the pressure of the MeOH stream flowing from the path 326. Accordingly, a stream of $CO_2$ with some MeOH vapor may exit an upper portion of the $CO_2$ recovery column 328 into a path 330. Conversely, a stream of $CO_2$-saturated MeOH may exit a lower portion of the column 328 into a path 332. Therefore, while the $CO_2$ recovery column 328 may remove at least a portion of the $CO_2$ from the MeOH, a substantial amount of the $CO_2$ may remain entrained within the MeOH flowing through pathway 332 due to the lowered pressure of the mixture. That is, the lowered-pressure MeOH has a lower saturation point of $CO_2$ compared to the stream of $CO_2$-saturated MeOH flowing into the $CO_2$ recovery column 328 from path 326. Therefore, the $CO_2$ recovery column 328 may be configured to reduce the pressure of the stream from path 326 by an amount suitable for a desired amount of $CO_2$ removal. Further, the MeOH flowing through the path 332 may also contain some $H_2O$. It should be noted that the $CO_2$ recovery column 328 may separate the $CO_2$ and MeOH into distinct pathways, with the path 330 generally flowing $CO_2$ and the path 332 generally flowing MeOH with various entrained components, such as water. Thus, path 330 and the conduits, vessels, and so forth that follow may be configured to perform operations on vapor-phase compounds, while path 332 and the conduits, vessels and so forth that follow may be configured to perform operations on both liquid and vapor-phase components. Each pathway will be discussed separately to facilitate discussion.

To facilitate the separation of the $CO_2$ and MeOH from the $H_2O$, the path 332 may transmit the MeOH stream through a heat exchanger 334, where it is cooled to between approximately −10 and −70° C., −20 and −65° C., −30 and −55° C., or −40 and −50° C. The cooled stream is then transmitted though a path 336 to a flash vessel 338. The flash vessel 338 may heat and/or reduce the pressure of the $CO_2$-saturated MeOH stream. The temperature of the stream may be increased to between approximately 0 and 80° C. (e.g., approximately 0, 10, 20, 30, 40, 50, 60, 70, or 80° C.). Further, the pressure may be reduced (in lieu of or in addition to the temperature increase) to a pressure of between approximately 1 and 30 psi (e.g., approximately 1, 5, 10, 15, 20, 25, or 30 psi). In other embodiments, the pressure may be measured by pressure change. That is, the pressure may be reduced by between approximately 10 and 3000% (e.g., approximately 10, 50, 100, 200, 500, 1000, 1500, 2000, 2500, or 3000%). Nevertheless, a stream of $CO_2$ and MeOH vapor may exit an upper portion of the vessel 338 into a path 340. The path 340 directs the vapor stream back to the $CO_2$ recovery column 328. It should be noted that regardless of the change in temperature and/or pressure, the flash vessel 338 may be generally configured to remove $H_2O$ from the MeOH and $CO_2$, such that the vapor stream flowing through pathway 340 is substantially dehydrated. That is, at least approximately 95 to 99% or greater of the water has been removed.

A stream of $H_2O$ and $CO_2$-rich MeOH exits a lower portion of the vessel 338 via pathway 342. The path 342 transmits the mixture to a split 344, which is configured to separate the $CO_2$-saturated MeOH from the $H_2O$. The split may be an area of reduced pressure, increased temperature, or any such configuration that allows the $H_2O$ to be removed from the MeOH stream. Accordingly, a $H_2O$ purge stream 346 exits one side of the split 344, while a stream of $CO_2$-saturated MeOH flows out to a path 348 on an opposing side of the split 344.

The stream of $CO_2$-saturated MeOH may have a reduced pressure that may not be suitable for motivation back though the carbon capture section 158 to the $CO_2$ absorber 304 (to which the stream is recycled). Accordingly, the flow rate and/or the pressure of the stream of $CO_2$-saturated MeOH may be increased by a pump 350, which may provide at least a portion of the motive force that carries the stream of $CO_2$-saturated MeOH through a path 352. It should be noted that in embodiments where the pressure of the stream of $CO_2$-saturated MeOH is increased, that the pump 350 may generate a stream of $CO_2$-rich MeOH, due at least partially to the increased ability of the higher pressure MeOH to solvate $CO_2$.

As noted above, the stream of $CO_2$-saturated or $CO_2$-rich MeOH may be recycled back to the $CO_2$ absorber 304, which may perform more efficiently with cooled MeOH. Thus, the stream of $CO_2$-saturated or $CO_2$-rich MeOH may be transmitted via path 352 to a heat exchanger 354, which may cool the stream of $CO_2$-saturated or $CO_2$-rich MeOH to a temperature between approximately −10 and −70° C., −20 and −65° C., −30 and −55° C., or −40 and −50° C. Again, the solubility of $CO_2$ may increase in cooled MeOH. Therefore, as the stream of $CO_2$ and MeOH is cooled, it may become $CO_2$-rich MeOH (in embodiments where the stream is $CO_2$-saturated MeOH) or $CO_2$ with some MeOH (in embodiments where the stream is $CO_2$-rich MeOH). Nevertheless, the stream flowing through the path 356 may be suitable for capturing $CO_2$ in the $CO_2$ absorber 304 from the sweetened syngas entering the absorber 304 from path 302.

Returning to the $CO_2$ recovery column 328, the stream of $CO_2$ and some MeOH vapor exits via the path 330. The stream of $CO_2$ and MeOH vapor is transmitted to a mixing chamber 358, where the vapor stream is allowed to mix with other $CO_2$-rich streams, such as $CO_2$ streams from the first solvent section 146. The mixed stream of vapor is then transmitted along path 360 to a heat exchanger 362. The heat exchanger 362 may be configured to cool the vapor stream and reduce its temperature by between approximately 20 to 500% (e.g., about 20, 40, 60, 80, 100, 200, 300, 400, or 500%). The cooled vapor stream may flow through a path 364 to a flash vessel 366, which may be a flash tank. The flash vessel 366 may quickly heat and/or reduce the pressure of the vapor stream, causing the $CO_2$ within the vapor stream to exit an upper portion of the vessel 366 into a path 368. The $CO_2$ flowing through the path 368 may be at least approximately 95% pure. For example, the $CO_2$ may be approximately 95, 96, 97, 98, or 99% or greater pure.

Condensed MeOH may exit the vessel 366 via path 370, which transmits the condensed MeOH to a pump 372. The pump 372 may increase the pressure and/or flow rate of the condensed MeOH to generate a stream of MeOH that flows through path 374 and into the $CO_2$ recovery column 328. In the illustrated embodiment, the path 374 provides the stream of MeOH into an area proximate an upper portion of the $CO_2$ recovery column 328. As such, MeOH that is substantially free of any dissolved gases is nearly constantly provided to the $CO_2$ recovery column 328 to ensure full dehydration of the $CO_2$.

The stream of substantially pure $CO_2$ flowing through path 368 may be transmitted to a mixing chamber 376. The mixing chamber 376 may be configured to allow mixing between the stream of substantially pure $CO_2$ and $CO_2$ from other areas in the gas processing unit 108. In the illustrated embodiment, the stream of $CO_2$ from path 368 mixes with the $CO_2$ 210 from the $H_2S$ concentration section 154. The stream exiting the mixing chamber 376 may be considered a stream of total $CO_2$ recovered 114 from the gas processing unit 108.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas purification system, comprising:
   a first solvent section, comprising:
      a first carbon dioxide ($CO_2$) absorber;
      a hydrogen sulfide ($H_2S$) absorber;
      a first solvent path that routes a first physical solvent through the first $CO_2$ absorber and the $H_2S$ absorber; and
   a second solvent section, comprising:
      a second carbon dioxide ($CO_2$) absorber;
      a second solvent path that flows a second physical solvent through the second $CO_2$ absorber; and
   a gas path through the first and second solvent sections, wherein the first and second solvent paths are separate from one another, and the first and second physical solvents are different from one another,
   wherein the gas path has a gas flow direction sequentially through the $H_2S$ absorber, the first $CO_2$ absorber, and the second $CO_2$ absorber.

2. The system of claim 1, wherein the first physical solvent comprises a glycol and the second physical solvent comprises an alcohol.

3. The system of claim 2, wherein the glycol comprises a dimethyl ether of polyethylene glycol (DEPG) and the alcohol comprises methanol.

4. The system of claim 1, wherein the second physical solvent has a minimum operating temperature of approximately −70° C. or lower.

5. The system of claim 1, wherein the first solvent path has a first solvent flow direction sequentially through the first $CO_2$ absorber and the $H_2S$ absorber.

6. The system of claim 1, wherein the first solvent path diverges from the first $CO_2$ absorber into a first intermediate path and a second intermediate path, wherein the first intermediate path routes the first physical solvent sequentially through the $H_2S$ absorber, a first flash tank, and a mixing chamber, wherein the second intermediate path routes the first physical solvent sequentially through a second flash tank, a $H_2S$ concentrator, and the mixing chamber.

7. The system of claim 6, wherein the first solvent path routes the first physical solvent from the mixing chamber sequentially through a $H_2S$ flash tank and a solvent recovery column.

8. The system of claim 1, wherein the second solvent path routes the second physical solvent sequentially through the second $CO_2$ absorber, a first flash tank, and a $CO_2$ recovery column.

9. The system of claim 1, wherein the second solvent section is configured to dehydrate $CO_2$.

10. The system of claim 1, wherein the gas purification system is configured to purify syngas from a gasifier.

11. A gas purification system, comprising:
    a first solvent section comprising a first solvent path and a first gas path, wherein the first solvent path circulates a first solvent to remove hydrogen sulfide ($H_2S$) from the first gas path;
    a second solvent section comprising a second solvent path and a second gas path, wherein the second solvent path is configured to remove carbon dioxide ($CO_2$) and water from the second gas path, wherein the first and second solvent paths are separate from one another, the first and second solvents are different physical solvents, the first gas path leads to the second gas path, and the first and second gas paths collectively comprise a gas flow direction sequentially through an $H_2S$ absorber, a first $CO_2$ absorber, and a second $CO_2$ absorber.

12. The system of claim 11, wherein the second solvent comprises an alcohol.

13. The system of claim 12, wherein the alcohol comprises methanol.

14. The system of claim 12, wherein the first solvent comprises a dialkyl ether of polyalkyleneglycol.

15. The system of claim 14, wherein the glycol comprises a dimethyl ether of polyethylene glycol (DEPG).

16. A gas purification system, comprising:
    a first solvent section, comprising:
       a first carbon dioxide ($CO_2$) absorber;
       a hydrogen sulfide ($H_2S$) absorber;
       a dimethyl ether of polyethylene glycol (DEPG) path that routes DEPG through the first $CO_2$ absorber and the $H_2S$ absorber; and
    a second solvent section, comprising:
       a second carbon dioxide ($CO_2$) absorber;
       a methanol path that flows methanol through the second $CO_2$ absorber; and
    a syngas path sequentially through the first and second solvent sections, wherein the DEPG solvent path and the methanol solvent path are separate from one another, and wherein the syngas path has a gas flow direction sequentially through the $H_2S$ absorber, the first $CO_2$, absorber, and the second $CO_2$ absorber.

17. The system of claim 16, wherein the DEPG path has a DEPG flow direction sequentially through the first $CO_2$ absorber and the $H_2S$ absorber.

18. The system of claim 17, wherein the DEPG path diverges from the first $CO_2$ absorber into a first intermediate path and a second intermediate path, wherein the first intermediate path routes the DEPG sequentially through the $H_2S$ absorber, a first flash tank, and a mixing chamber, wherein the second intermediate path routes the DEPG sequentially through a second flash tank, a $H_2S$ concentrator, and the mixing chamber, wherein the DEPG path routes the DEPG from the mixing chamber sequentially through a $H_2S$ flash tank and a DEPG recovery column.

19. The system of claim 18, wherein the methanol path routes the methanol sequentially through the second $CO_2$ absorber, a third flash tank, and a $CO_2$ recovery column.

20. The system of claim 1, wherein the $H_2S$ absorber receives the first solvent only via the first solvent path.

21. A gas purification system, comprising:
    a first solvent section, comprising:
       a first carbon dioxide ($CO_2$) absorber;
       a hydrogen sulfide ($H_2S$) absorber;
       a first solvent path that routes a first solvent through the first $CO_2$ absorber and the $H_2S$ absorber; and
    a second solvent section, comprising:
       a second carbon dioxide ($CO_2$) absorber;
       a second solvent path that flows a second solvent through the second $CO_2$ absorber; and
    a gas path through the first and second solvent sections, wherein the first and second solvent paths are separate from one another, and the first and second physical solvents are different from one another,
    wherein the first solvent path diverges from the first $CO_2$ absorber into a first intermediate path and a second intermediate path, wherein the first intermediate path routes the first solvent sequentially through the $H_2S$ absorber, a first flash tank, and a mixing chamber, wherein the second intermediate path routes the first solvent sequentially through a second flash tank, a $H_2S$ concentrator, and the mixing chamber.

22. The system of claim 21, wherein the first solvent path routes the first physical solvent from the mixing chamber sequentially through a $H_2S$ flash tank and a solvent recovery column.

23. A gas purification system, comprising:
a first solvent section, comprising:
  a first carbon dioxide ($CO_2$) absorber;
  a hydrogen sulfide ($H_2S$) absorber;
  a dimethyl ether of polyethylene glycol (DEPG) path that routes DEPG through the first $CO_2$ absorber and the $H_2S$ absorber; and
a second solvent section, comprising:
  a second carbon dioxide ($CO_2$) absorber;
  a methanol path that flows methanol through the second $CO_2$ absorber; and
  a syngas path sequentially through the first and second solvent sections, wherein the DEPG solvent path and the methanol solvent path are separate from one another, and
wherein the DEPG path diverges from the first $CO_2$ absorber into a first intermediate path and a second intermediate path, wherein the first intermediate path routes the DEPG sequentially through the $H_2S$ absorber, a first flash tank, and a mixing chamber, wherein the second intermediate path routes the DEPG sequentially through a second flash tank, a $H_2S$ concentrator, and the mixing chamber, wherein the DEPG path routes the DEPG from the mixing chamber sequentially through a $H_2S$ flash tank and a DEPG recovery column.

24. The system of claim 23, wherein the methanol path routes the methanol sequentially through the second $CO_2$ absorber, a third flash tank, and a $CO_2$ recovery column.

* * * * *